United States Patent [19]
Taylor

[11] 3,812,794
[45] May 28, 1974

[54] STAIRSTEP JET PULSE INCINERATOR

[76] Inventor: Fred W. Taylor, 60 Village Cir., Bartow, Fla. 33830

[22] Filed: Sept. 21, 1972

[21] Appl. No.: 291,029

[52] U.S. Cl. .............................. 110/8 R, 110/32 R
[51] Int. Cl. ............................................. F23g 3/00
[58] Field of Search ............... 110/8 R, 32 R, 33, 74

[56] References Cited
UNITED STATES PATENTS

| | | | |
|---|---|---|---|
| 1,435,948 | 11/1922 | Van Brunt | 110/74 |
| 1,442,116 | 1/1923 | Balmer | 110/8 R |
| 1,798,019 | 3/1931 | Harrison | 110/33 |
| 1,957,921 | 5/1934 | White | 110/32 R |
| 3,317,202 | 5/1967 | Cates, Jr. et al. | 432/103 |
| 3,433,468 | 3/1969 | Schoenlaub | 432/134 |
| 3,489,527 | 1/1970 | Cates, Jr. et al. | 110/8 R |

Primary Examiner—Kenneth W. Sprague
Assistant Examiner—Henry C. Yuen
Attorney, Agent, or Firm—Cushman, Darby & Cushman

[57] ABSTRACT

An improved combustion furnace having a grate formed as a plurality of downward leading steps from an upper to a lower region with a number of separated, outwardly flaring openings among the steps, and a source of air connected to the openings by valves which can be sequentially actuated to supply pulses of air which promote combustion as the air penetrates into and among the burning material and at the same time moves the burning material down the grate.

11 Claims, 2 Drawing Figures

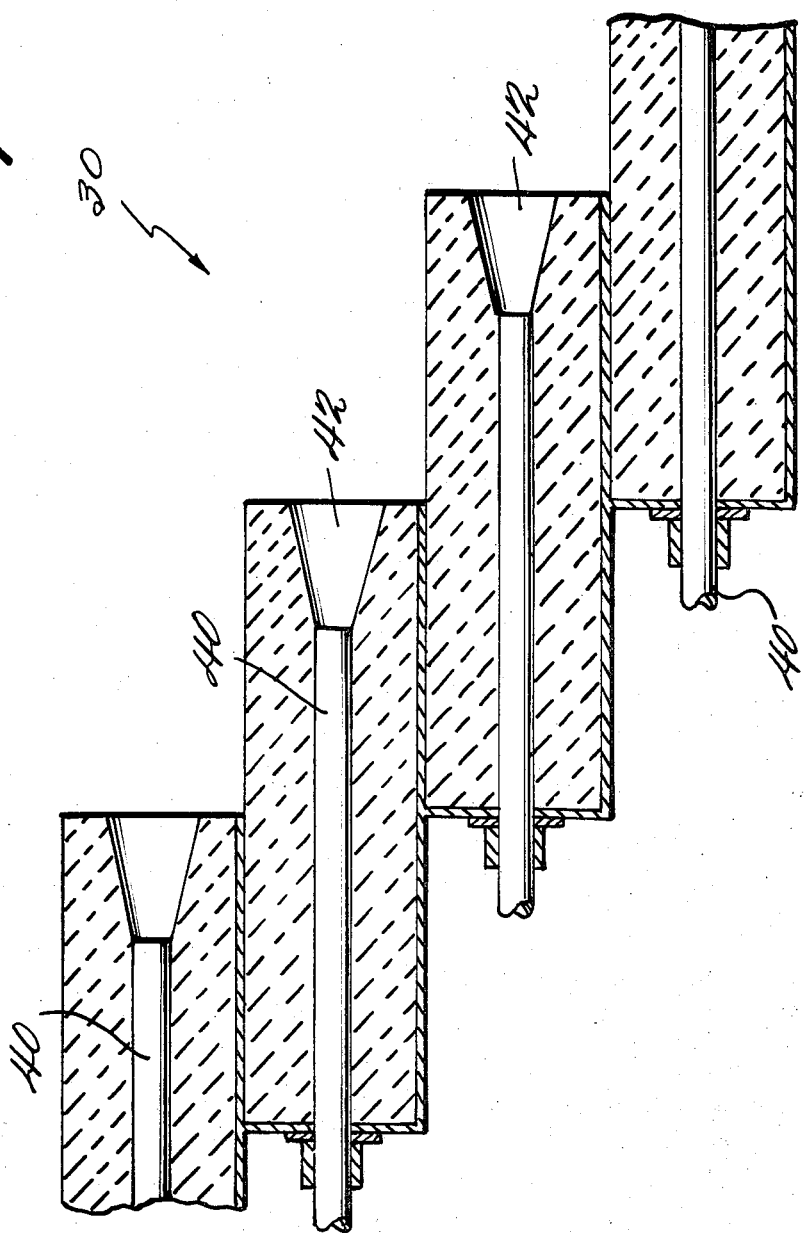

STAIRSTEP JET PULSE INCINERATOR

BRIEF DESCRIPTION OF THE PRIOR ART AND SUMMARY OF THE INVENTION

The invention relates to a combustion furnace.

The treatment and disposal of man's waste and discard has become one of the major problems of this technological society. Solid waste has in the past primarily just been dumped in land fills. However, because of contamination of adjacent streams and lakes resulting from seepage and runoff of decomposing garbage and other material and because the value of land is increasing while land suitable for land fill operation is becoming scarce, new techniques for efficiently disposing of the increasing mass of solid waste generated by society are required.

One approach to the disposal of solid waste as well as sanitary waste and other similar material lies in the combined and interrelated treatment of all such materials in a single plant which can also be used to produce potable water. The solid waste can be incinerated, preferably continuously, and the heat generated by that incineration employed as an energy source for distillation of water or any other suitable purpose relating to waste treatment. The incombustible material, including metals, glass and the like can then be recovered from the incinerator and recycled. A co-pending application entitled "Solid Waste and Sanitary Waste Treatment" by the inventor of this application filed Nov. 14, 1972, Ser. No. 306,383, describes one such integrated treatment plant.

In such a plant there is a need for a combustion chamber or incinerator in which the solid waste can be quickly, efficiently and continuously combusted with the incombustible metals and the like deposited on a conveyor or the like from which they can be continuously and simply moved to a further processing location. It is also desirable that the solid waste be combusted as completely as possible.

The present invention relates to such a combustion chamber which includes a grate disposed therein and formed with a plurality of steps leading from an upper chamber into which the raw solid waste is deposited to a lower chamber from which the uncombusted material is conveyed. Formed among these steps of the grate are a number of outwardly flaring openings which are connected by suitable solenoid valves and a header pipe to an air receiver tank or reservoir and an air compressor. A simple logic circuit operates the solenoid valves in a sequence so as to produce a wave of air pulses which moves the burning solid waste from the upper region to the lower region, while at the same time promoting combustion as the air of other combustion supporting gas penetrates into and among the burning material. The outwardly flaring openings allow a rapid expansion of the air as it enters the combustion chamber, causing it to be released over a wide area, and producing a particularly effective material moving blast. The lower chamber preferably includes a quench tank into which the uncombusted material falls and a conveyor in the quench tank for removing the uncombusted solid waste to a further processing location.

There have been several suggestions in the past to use waves of air, generated, e.g., by a stair-step configuration, to move material from one location to another. For example, the patents to Balmer, Nos. 1,460,565 and 1,442,116 both describe an arrangement in which trash is moved from one level of a storage area into a combustion area by the application of successive blasts of air. The invention of this application, however, contemplates not only the use of pulses of air to move the waste, but at the same time, to promote combustion during that movement as described above so as to efficiently and continuously move the burning solid waste through the combustion chamber.

Many other objects and purposes of the invention will be clear from the following detailed description of the drawings.

BRIEF DESCRIPTION OF THE DRAWINGS

FIG. 2 shows a cut-away view of a plurality of the refractory bricks which form the stair-step grate.

DETAILED DESCRIPTION OF THE DRAWINGS

Figure 1:
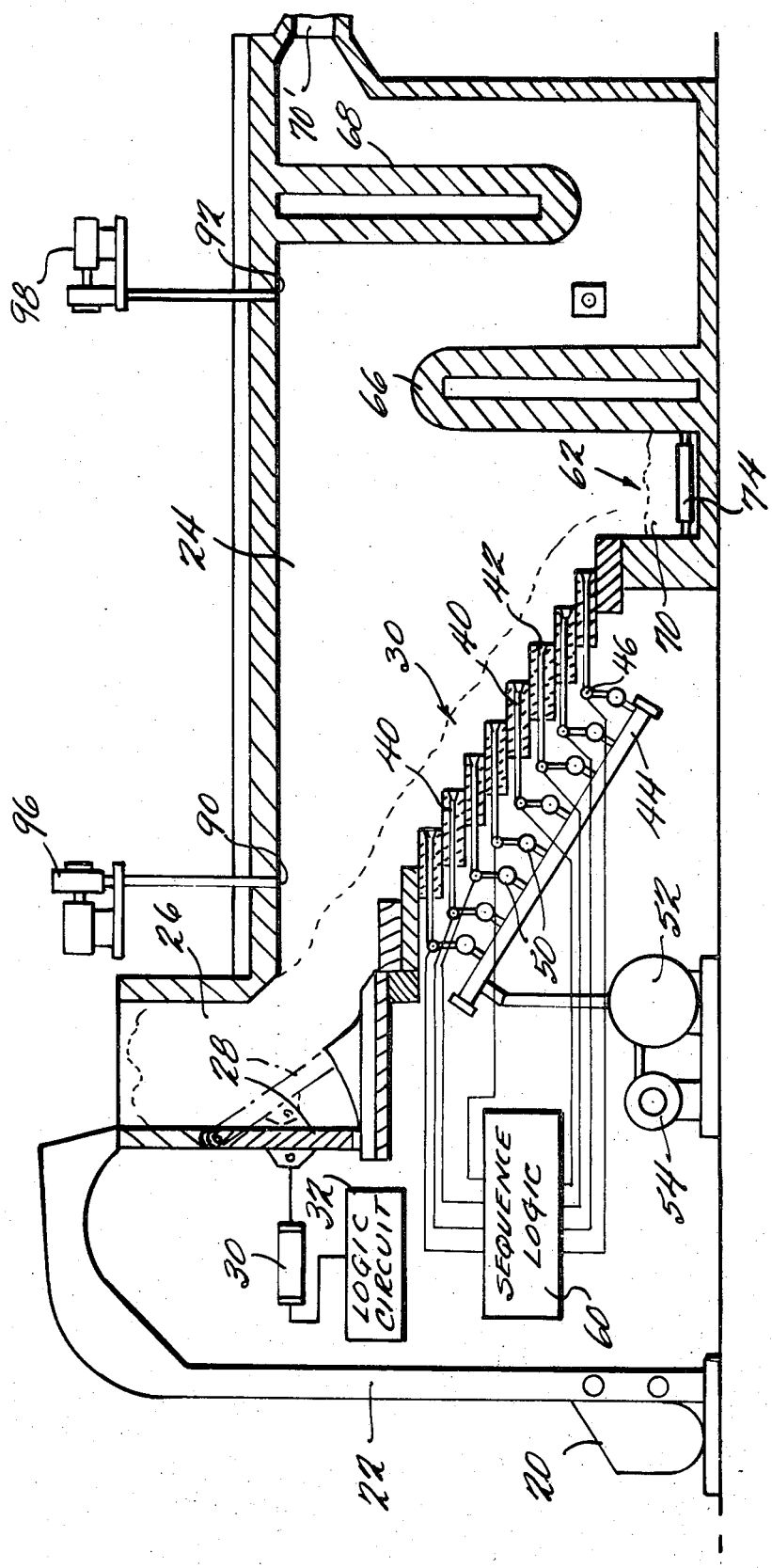
FIG. 1 shows a schematic view of the novel combustion chamber of this application.

Reference is now made to FIG. 1 which shows a somewhat schematic view of the novel combustion chamber of this application. Solid waste, which may be comprised of garbage, paper, bits of metal and other materials derived from commercial, residential and other sources, is deposited in a bucket 20 which is mounted on a conventional skip-hoist 22. A front end loader or any other device may be used for the purpose of filling bucket 20. Bucket 20 is then elevated on skip-hoist 22 and the material therein dumped into the open top of combustion chamber 24, filling an upper region 26 as can be seen in FIG. 1.

The material in the upper region 26 is pushed out of that region bit by bit by a ram plate 28 which is operated by a hydraulic cylinder 30 under the control of a suitable logic circuit 32. Logic circuit 32 may provide a variable speed control control in order to feed the material at the desired rate which for a given system produces the most efficient combustion.

The material pushed out of upper region 26 by ram plate 28 falls onto the steps of the stair-step grate 30. Grate 30 is preferably formed of a number of refractory bricks which each extend slightly beyond the one above it as can be seen best, e.g., in FIG. 2, so as to form a plurality of horizontal steps. Each of the refractory bricks, as can be seen in FIG. 2, is preferably surrounded on at least three sides with twelve gauge metal and each has a passageway, for example, passageway 40 extending through it parallel to the horizontal surface and terminating in an upwardly flaring opening such as opening 42. The cross-section of this opening thus increases as the passageway approaches its termination at the face of the respective refractory brick. It will be understood that while the arrangement in FIGS. 1 and 2 in which the passageways pass through each of the bricks has been found to be satisfactory, any alternative arrangement for providing openings can be employed.

Each of the tubes passing through each of the refractory bricks is connected to a main header pipe or manifold 42 by an individual solenoid and a cross-row header pipe which connects to the bricks in the same row. For example, passageway 40 is connected to header pipe 44 via solenoid valve 46 and cross-row header pipe 50. Main header pipe 44 is in turn connected to a conventional air receiving tank 52 which functions as a reservoir and a conventional air compressor 54 which supplies air under pressure to tank 52. Each of the solenoid valves which control the flow of air through the passages in the refractory bricks are controlled by a conventional logic circuit 60 which may simply be an electrical stepping switch connecting a power source first to the solenoid valves in one brick row then to the solenoids in the next lower row, etc. Sequential logic 60 is preferably designed so that the valves are sequentially actuated to create an air wave which operates to move the solid waste material which falls on grate 30, when ram plate 28 is operated, down grate 30 and into a lower receiving region 62. For this purpose, normally the valves are operated so that the opening in each brick generates a pulse just following the pulse generated and applied from the opening in the brick just above it. The pulses of air or other combustion supporting gas, such as pure oxygen, operate to both move the burning material from the upper region to the lower region continuously and efficiently and at the same time promote combustion as the combustion supporting gas penetrates into and among the material being burned.

The combustion in chamber 24 is of the self-sustaining variety, by which is meant that once combustion has begun, the heat and flame produced by the burning material moving down the grate ignite the uncombusted material following so that the continual impingement of heat and/or flame is not necessary. However, if desired, additional gas or other burners can be mounted so as to impinge flame and/or heat onto the material as it moves down the grate. One of the unique advantages of this system, however, is the extremely efficient combustion and solid waste transportation which is effected by the stair-step grate as described above.

As mentioned, each of the passageways through each of the refractory bricks preferably terminates in an outwardly flaring opening. The use of this opening allows sudden expansion of the gas in a fashion similar to a venturi, releasing air over a wide area which produces a blast to effectively move the material.

The uncombusted material which falls into region 62 preferably falls into a quench tank 70 which is filled with water or other suitable liquid. The heat thus transferred to the water in the quench tank can be used for any other suitable purpose in the processing plant. The vapor generated by the deposit of the uncombusted materials rises and passes between baffles 66 and 68 and out opening 70 together with the gases produced by combustion for further treatment as may be desired. The uncombusted solid material falls on a conventional conveyor belt 74 in quench tank 70 and is conveyed to a further suitable location at which the different types of metals and glass may be separated, etc. for recycling.

Two additional openings 90 and 92 in combustion chamber 24 connect respectively to air blowers 96 and 98 to supply additional air to combustion chamber 24. Air flow 96 further seals the opening of the incinerator against the escape of hot gases while forcing oversized material onto incinerator grate 30.

Many changes and modifications in the above-described embodiment of the invention can, of course, be made without departing from the scope of the invention. Accordingly, that scope is intended to be limited only by the scope of the appended claims.

What is claimed is:

1. In a combustion furnace the improvement comprising:
a grate disposed in a combination chamber for burning material and formed with a plurality of refractory bricks forming steps leading from an upper region to a lower region and having a plurality of groups of separated openings with the openings in each group extending along one said step,
a source of a combustion supporting gas, and
means for sequentially connecting said source to each of said groups of openings, the groups connected in a fixed order from the upper to lower regions to supply pulses of said combustion supporting gas to said openings of said groups so as to promote combustion as the combustion supporting gas penetrates into and among the material being burned and at the same time move the burning material from said upper region to said lower region.

2. In a combustion furnace the improvement comprising:
a grate disposed in a combustion chamber for burning material and formed with a plurality of steps leading from an upper region to a lower region and having a plurality of separated openings among said steps,
a source of a combustion supporting gas, and
means for connecting said source to each of said openings and for supplying pulses of said combustion supporting gas to said openings so as to promote combustion as the combustion supporting gas penetrates into and among the material being burned and at the same time move the burning material from said upper region to said lower region, including a plurality of tubes each terminating in one of said openings and increasing its cross sectional area as it approaches that opening in the vicinity of that opening so as to produce sudden expansion of the combustion supporting gas exiting from that opening and releasing the gas over a wide area producing a blast of combustion supporting gas.

3. In a furnace as in claim 2 wherein said grate is formed from a plurality of refractory bricks with said tubes each extending through one of said bricks.

4. In a furnace as in claim 1 wherein said connecting and supplying means includes means for compressing air, air storage means connecting to said compressing means for storing compressed air, a plurality of air lines each connecting one of said openings to said storage means, valve means disposed in each of said lines for applying an air pulse to said opening and means connected to each of said valves for sequentially actuating said valves to cause the burning material to move down said steps of said grate from said upper region to said lower region.

5. In a furnace as in claim 1 further including bucket means for receiving material to be burned so that the material falls into said upper region.

6. In a furnace as in claim 5 further including ram means for pushing material deposited in said hopper means to a position where the material begins falling by gravity down the steps of said grating.

7. In a furnace as in claim 1 further including conveyor means for conveying unburned material from said lower region.

8. In a furnace as in claim 1 further including a plurality of walls bounding said combustion chamber at least one having an opening and means for blowing air into said chamber via that opening.

9. In a furnace as in claim 1 wherein said combustion supporting gas is air.

10. In a furnace as in claim 1 wherein said steps are comprised of a plurality of refractory bricks.

11. In a furnace as in claim 1 further including a quench tank in said lower region for receiving uncombusted material and means in said quench tank for conveying that uncombusted material out of said lower region.

* * * * *